Aug. 23, 1966   T. WEI   3,268,104
COMBINED ADJUSTABLE VALVE FOR LIQUIDS IN MULTIPLE FOOD VESSELS
Filed April 23, 1964   3 Sheets-Sheet 1
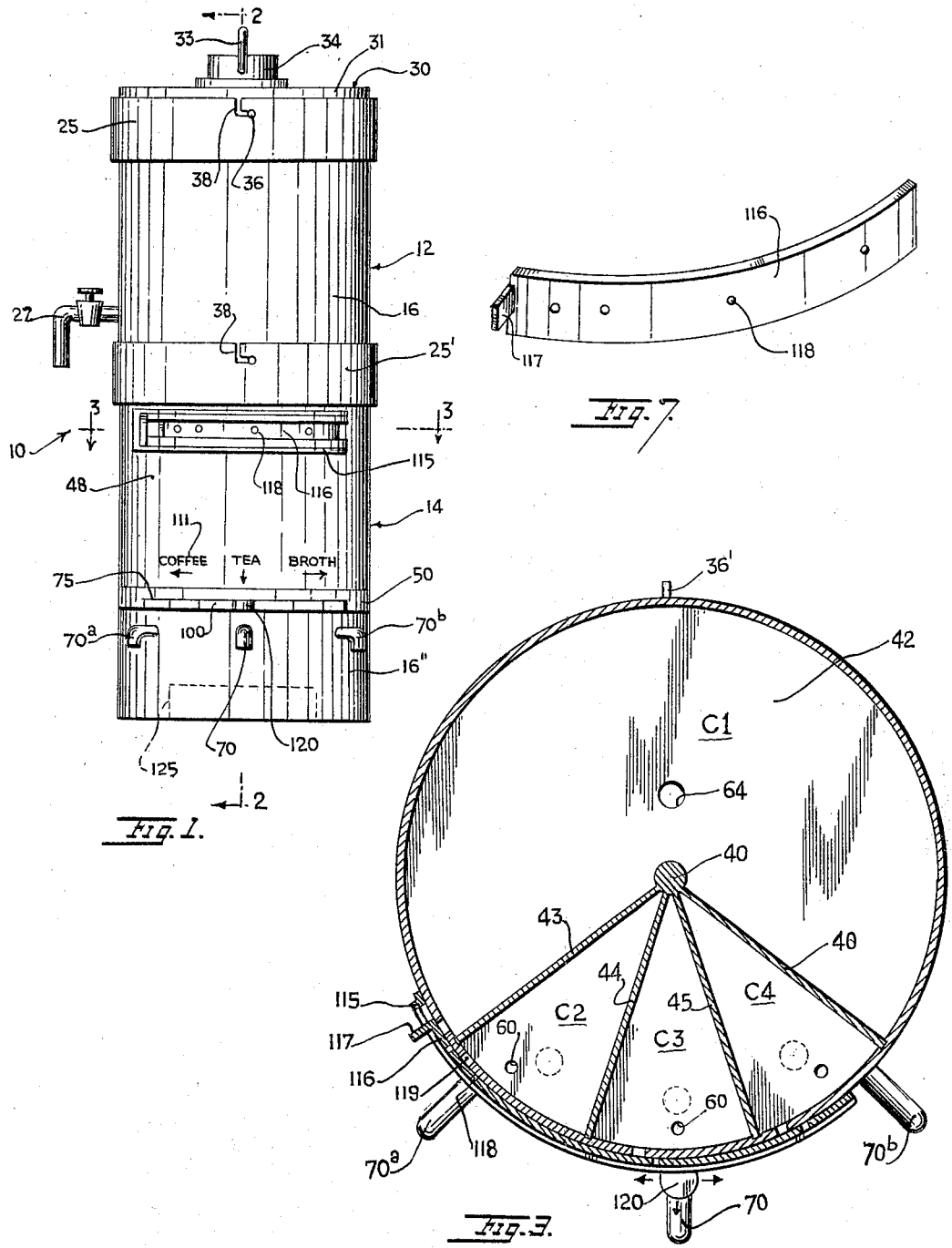
INVENTOR.
TOHCHUNG WEI
BY
*Polachek Saulsbury*
ATTORNEYS

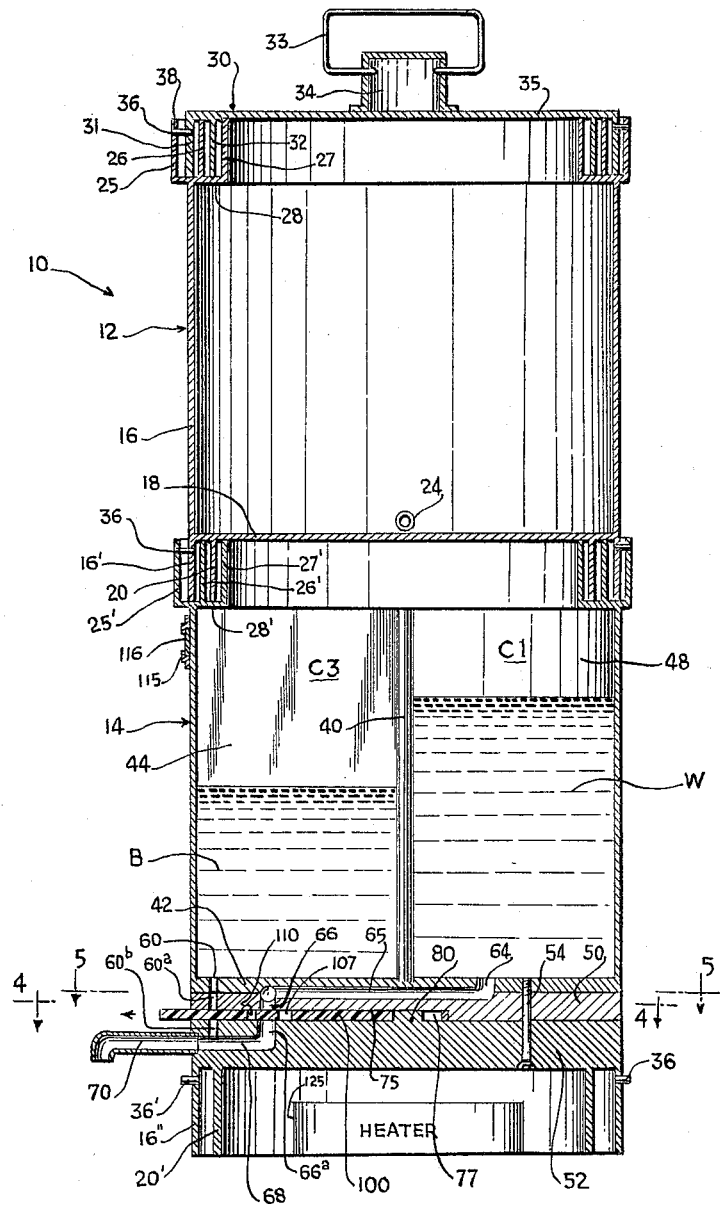

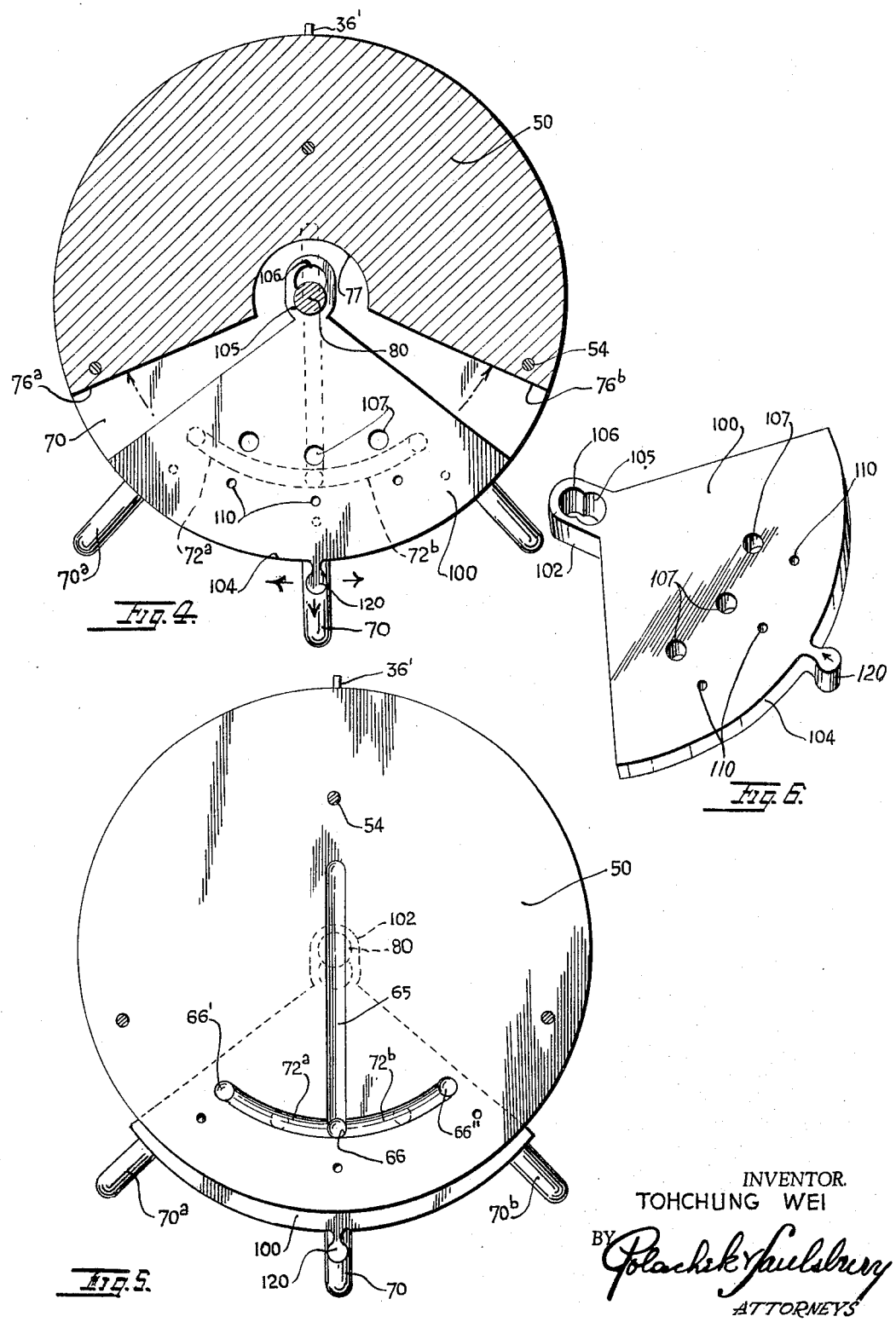

United States Patent Office 3,268,104
Patented August 23, 1966

3,268,104
COMBINED ADJUSTABLE VALVE FOR LIQUIDS IN MULTIPLE FOOD VESSELS
Tohchung Wei, 169 E. Broadway, New York, N.Y.
Filed Apr. 23, 1964, Ser. No. 362,016
10 Claims. (Cl. 220—4)

This invention relates to the art of food vessels having multiple compartments, and more particularly concerns means for selectively dispensing the contents of such vessels.

This invention is a continuation-in-part of my application Serial No. 299,799, filed August 5, 1963, and involves an improvement thereover.

In my prior application, I disclosed a cylindrical vessel having a closed bottom and top. At the top and bottom of the vessels were provided annular spaced, concentric flanges. The flanges of one vessel interfit in sealing relationship with the flanges of another similar vessel to form an axially aligned stack. A cover having annular, spaced, concentric flanges is provided to close and seal the open top of the vessel. Means are provided for detachably securing the stacked vessels together so that an assembly of containers could be stored and transported.

The present invention provides means for discharging the contents of one or more vessels without removing any vessel from the stack. According to the invention a vessel may have multiple compartments which may contain beverages or liquid ingredients for making beverages. Novel selectively operable valve means to permit mixing together the liquids from two compartments while the liquids are withdrawn therefrom.

It is one object of the invention to provide a cylindrical vessel with multiple compartments for containing different liquids, with interconnecting channels through which the liquid from one compartment is mixed with the liquid from any one of the other compartments.

A further object is to provide a cylindrical vessel as described with a rotatable and slidable valve for selecting the compartment whose liquid contents are to be mixed with the liquid contents of the one compartment and for controllably discharging the mixed liquids after selection is made.

Another object is to provide a stack of cylindrical vessels as described, in which means is provided for heating the liquid contents of at least the one compartment in the multiple compartment container so that the heated liquid therein may serve as a source of heat for another superimposed vessel.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a stack of containers embodying the invention.

FIG. 2 is a vertical sectional view on an enlarged scale taken on line 2—2 of FIG. 1.

FIG. 3 is a cross-sectional view on an enlarged scale taken on line 3—3 of FIG. 1.

FIG. 4 and FIG. 5 are cross-sectional views taken on lines 4—4 and 5—5, respectively, of FIG. 2, with a valve plate shown in retracted and extended positions respectively.

FIG. 6 is a perspective view of a valve plate according to the invention.

FIG. 7 is a perspective view of an air vent control plate.

Referring to the drawings, there is shown in FIGS. 1 and 2, a stack 10 of vessels or containers 12 and 14. Vessel 12 is similar to that described in my above mentioned application. It has a cylindrical body 16, circular bottom 18 and open top. At the bottom is a cylindrical flange 20 concentric with and radially spaced from outer flange 16' which is continuous with body 16. A faucet 22 having an outlet 24 near the bottom of the container is provided to discharge liquid contents of the vessel or container. At the top of the vessel are three cylindrical flanges 25, 26 and 27 radially spaced apart and supported by a horizontal annular flange 28.

A cover 30 is provided for the stack of vessels. This cover has two cylindrical flanges 31, 32 concentric with each other and radially spaced apart to fit between flanges 25, 26 and between flanges 26, 27, respectively, for sealing the open top of container 12. The cover has a carrying handle 33 engaged in a boss 34 attached to the circular top 35 of the cover. Pins 36 extend outwardly of the cover in axial alignment at diametrically opposed positions to engage in bayonet slots 38 formed near the upper edge of outer flange 25. It will be understood that a plurality of vessels similar to vessel 12 could be stacked in axial alignment and detachably secured together by engaging the bayonet joints 36, 38 of superimposed vessels.

Container 14 is provided with upper cylindrical flanges 25', 26', 27' concentric with each other and radially spaced on flange 28' like flanges 25, 26, 27 to receive the bottom outer flange 16' and inner flange 20 in sealing relation. An axial post 40 is provided in container 14. This post is secured to a flat bottom plate 42 in the container. A plurality of partition plates 43, 44, 45 and 46, best shown in FIGS. 2 and 3, extend radially from post 40 and are secured by welding or the like to the inner side of the cylindrical wall 48 of the container. The top of the container is open so that compartments C1–C4 can be filled with various liquids. Preferably compartment C1, which is the largest and occupies about three-quarters of the volume of the container, will be filled with water W. Compartments C2–C4, which are smaller than compartment C1, may contain syrups or liquid concentrates of various beverages B such as coffee, tea, broth, and the like.

Juxtaposed to the bottom plate 42 is an intermediate circular plate 50 and another circular plate 52 is juxtaposed to the underside of plate 50. Screws 54 extend through holes in the plates 50, 52 and are screwed in threaded recesses in plate 42. This forms a unitary plate assembly which serves as a support for the container. Plate 52 has a peripheral cylindrical wall 16" in which are engaged bayonet pins 36', and an inner cylindrical flange 20', so that another container similar to container 12 or 14 can be placed underneath container 14 with flanges in interfitting, sealing relationship.

In the bottom plate 42 are formed small holes 60 providing bottom outlets for the liquids in compartments C2–C4, respectively. A large hole 64 is formed in plate 42 to provide an outlet for the contents of compartment C1. A diametrally extending channel 65 formed by opposing grooves in the underside of plate 42 and the upper side of plate 50 extends from hole 64 to an axially vertical hole 66 in plate 50. This hole is aligned with a hole 66ª in plate 52. A passage 68 extends outwardly to the periphery of plate 52 where it communicates with an outlet pipe 70.

Channel 65 has two circumferentially extending branches 72ª, 72ᵇ; see FIGS. 2, 4 and 5. These branches terminate at axially vertical holes 66' and 66" aligned with further vertical holes 66ᵇ, 66ᶜ. Further passages like passages 68 communicate with outlet pipes 70ª and 70ᵇ at opposite sides of pipe 70.

Each hole 60 is aligned with a hole 60ª in plate 50 which is aligned with a hole 60ᵇ in plate 52. Each hole 60ᵇ opens into different horizontal passages 68.

In the bottom of plate 50 is a flat recess or cutout 75 with angularly disposed edges 76ª, 76ᵇ and an apical generally semicircular extension 77. A cylindrical boss or projection 80 is formed on plate 52 and extends into the recess extension 77.

A valve plate 100 formed generally as a sector of a circle is slidably and rotatably disposed in the recess 75 defined between plates 50 and 52. This plate, as clearly shown in FIGS. 4 and 6, has an apical extension defining a flexible loop 102. The loop has center inwardly extending points so that the loop can engage and rotate on boss 80 in either of two poistions. If plate 100 is in its inner position, its outer edge 104 registers with the outer edges of plates 50 and 52 and the inner parts 105 of the loop engage boss 80. If plate 100 is in its outer position as indicated in FIG. 5, then the outer portion 106 of the loop engages the boss 80.

Sector plate 100 has three large holes 107 and three smaller holes 110. When the plate is in its inner position it can be rotated by means of handle 120 extending radially outward of the plate, between recess edges 76ª, 76ᵇ without bringing any of the holes in the plate 100 in registration with any of the holes in plates 50 and 52. If the plate is pulled outwardly to snap the loop portion 106 on boss 80, then one of the holes 107 can be aligned with one pair of holes 66, 66ª and one of holes 110 can be aligned with one pair of holes 60ª, 60ᵇ if plate 100 is in its center position of rotation as shown in FIGS. 1–5; or is in its right position, the "Broth" position; or is in its left position, the "Coffee" position.

The indicia 111 reading "Coffee," "Tea" and "Broth" on the container wall 48 indicate the three positions to which the valve plate 100 may be rotated to obtain discharge of a desired beverage.

On the cylindrical wall 48 of the container 14 is a channel frame 115 which slidably supports an arcuate narrow plate 116; see FIGS. 1, 3 and 7. Plate 116 has holes 118 which can be registered with holes 119 formed in the cylindrical wall 48 and communicating with compartments C1–C4 respectively. Holes 119 serve as vents for relieving excess steam or vapor pressure in the several compartments when the holes 118 are registered with holes 119. Plate 116 has a projecting finger 117 which facilitates sliding the plate. When the liquid contents of the compartments are to be discharged, holes 119 with registered holes 118 serve to relieve suction inside the compartments.

In operation of the dispensing apparatus, a suitable heater 125 can be placed underneath the bottom plate 52 to heat the contents of container 14, especially the water in compartment C1. This water, when heated, will serve as a heat source to heat the contents of the upper container 12.

If it is desired to dispense one of the beverages from the container 12, valve plate 100 in its inner position will be rotated until handle 120 is located at the center, right or left beverage indication on the container. Then the handle will be pulled outwardly to open the passage from the hot water compartment C1 to one of the outlet pipes 70, 70ª or 70ᵇ. At the same time a narrow passage is opened to one of compartments C2–C4 so that the beverage concentrate is mixed with the water flowing out of the hot water compartment to complete the beverage mixture.

The flow is cut off by pushing plate 100 inwardly and is restored by pulling the plate outwardly. Turning the plate to another position changes the beverage mixture which is dispensed.

The invention thus makes it possible to discharge the contents of the multiple compartment container 14 without disassembling the stack. The contents of one compartment are selectively mixed with the contents of any other compartment, to provide the user with a selection of beverages.

The valve plate 100 should preferably be made of a heat resistant, flexible, plastic material such as one of the silicone plastics, polytetrafluorethylene, or the like.

The several parts of the container 14 and of the entire stack 10 can easily be assembled or disassembled if required for serving. As many containers 12 and 14 can be stacked together in one assembly as my be desired.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A vessel for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, and valve means in said support interposed between said first and second passages and the outlet pipes for selectively opening any one of the first passages and a communicating one of the second passages, whereby the liquid contents of the one compartment is mixed with the liquid contents of any one of the other compartments and the mixed liquids are discharged from one of the outlet pipes.

2. A container for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, said support having a flat recess formed therein and located between the outlet pipes and the first and second passages, and a flat apertured plate valve rotatably disposed in said support for selecting any one of the first passages and a communicating one of the second passages for mixing liquids of one compartment with a selected other compartment and for discharging the mixed liquids from one of the outlet pipes.

3. A container for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, said support having a flat recess formed therein and located between the outlet pipes and first and second passages, a flat sector plate having a plurality of circumferentially spaced holes, pivot means in said recess, said sector plate having a flexible loop at its apical end engaged on said pivot means so that the sector plate is rotatable on said pivot means and is radially slidable between two positions, whereby said sector plate may be rotated to any one of several positions to select one of the first passages and one of the second passages, and whereby the sector plate may be pulled outwardly to align certain holes in the sector plate with the selected one of the first and second passages, so that a mixture of liquids from one compartment and any one of the other compartments is discharged through one of the outlet pipes.

4. A container for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, said support having a flat recess formed therein and located between the outlet pipes and first and second passages, a flat sector plate having a plurality of circumferentially spaced holes, pivot means in said recess, said sector plate having a flexible loop at its apical end engaged on said pivot means so that the sector plate is rotatable on said pivot means and is radially slidable between two positions, whereby said sector plate may be rotated to any one of several positions to select one of the first passages and one of the second passages, and whereby the sector plate may be pulled outwardly to align certain holes in the sector plate with the selected one of the first and second passages, so that a mixture of liquids from one compartment and any one of the other compartments is discharged through one of the outlet pipes, said cylindrical wall having vent openings near the top thereof communicating with each of said compartments, and a slidable narrow plate slidably mounted on said cylindrical wall, said narrow plate having other openings registrable with the vent openings to relieve any suction and excess pressure in the compartments.

5. A container for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, said support having a flat recess formed therein and located between the outlet pipes and the first and second passages, and a flat apertured plate valve rotatably disposed in said support for selecting any one of the first passages and a communicating one of the second passages for mixing liquids of one compartment with a selected other compartment and for discharging the mixed liquids from one of the outlet pipes, said cylindrical wall having vent openings near the top thereof communicating with each of said compartments, and a slidable narrow plate slidably mounted on said cylindrical wall, said narrow plate having other openings registrable with the vent openings to relieve any suction and excess pressure in the compartments.

6. A container for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, and valve means in said support interposed between said first and second passages and the outlet pipes for selectively opening any one of the first passages and a communicating one of the second passages, whereby the liquid contents of the one compartment is mixed with the liquid contents of any one of the other compartments and the mixed liquids are discharged from one of the outlet pipes, said cylindrical wall having vent openings near the top thereof communicating with each of said compartments, and a slidable narrow plate slidably mounted on said cylindrical wall, said narrow plate having other openings registrable with the vent openings to relieve any suction and excess pressure in the compartments.

7. A container for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, said support having a flat recess formed therein and located between the outlet pipes and first and second passages, a flat sector plate having a plurality of circumferentially spaced holes, pivot means in said recess, said sector plate having a flexible loop at its apical end engaged on said pivot means so that the sector plate is rotatable on said pivot means and is radially slidable between two positions, whereby said sector plate may be rotated to any one of several positions to select one of the first passages and one of the second passages, and whereby the sector plate may be pulled outwardly to align certain holes in the sector plate with the selected one of the first and second passages, so that a mixture of liquids from one compartment and any one of the other compartments is discharged through one of the outlet pipes, said bottom support having at least one depending cylindrical flange elevating the same above a supporting surface and defining a heating compartment for receiving a heater to heat the liquid contents of the compartments.

8. A container for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, said support having a flat recess formed therein and located between the outlet pipes and first and second passages, a flat sector plate having a plurality of circumferentially spaced holes, pivot means in said recess, said sector plate having a flexible loop at its apical end engaged on said pivot means so that the sector plate is rotatable on said pivot means and is radially slidable between two positions, whereby said sector plate may be rotated to any one of several positions to select one of the first passages and one of the second passages, and whereby the sector plate may be pulled outwardly to align certain holes in the sector plate with the selected one of the first and second passages, so that a mixture of liquids from one compartment and any one of the other compartments is discharged through one of the outlet pipes, said bottom support having at least one depending cylindrical flange elevating the same above a supporting surface and defining a heating compartment for receiving a heater to heat the liquid contents of the compartments, said cylindrical wall having vent openings near the top thereof communicating with each of said compartments, and a slidable narrow plate slidably mounted on said cylindrical wall, said narrow plate having other openings registrable with the vent openings to relieve any suction and excess pressure in the compartments.

9. A container for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, said support having a flat recess formed therein and located between the outlet pipes and first and second passages, a flat sector plate having a plurality of circumferentially spaced holes, pivot means in said recess, said sector plate having a flexible loop at its apical end engaged on said pivot means so that the sector plate is rotatable on said pivot means and is radially slidable between two positions, whereby said sector plate may be rotated to any one of several positions to select one of the first passages and one of the second passages, and whereby the sector plate may be pulled outwardly to align certain holes in the sector plate with the selected one of the first and second passages, so that a mixture of liquids from one compartment and any one of the other compartments is discharged through one of the outlet pipes, said cylindrical wall carrying a plurality of concentric cylindrical flanges for receiving other cylindrical flanges of another container in interfitting, sealed relationship to form a stack of containers.

10. A vessel for liquids, comprising a hollow body having a cylindrical wall, a closed circular bottom and open top, a plurality of partitions within said wall and sealed to the bottom to define a plurality of compartments, said bottom having individual outlet holes for the several compartments, a bottom support for said body, a plurality of outlet pipes connected to said support, said support having a plurality of first passages therein connecting the hole of one compartment with each of the outlet pipes, said body having second passages respectively connecting the holes in the bottoms of the other compartments with said first passages, said support having a flat recess formed therein and located between the outlet pipes and first and second passages, a flat sector plate having a plurality of circumferentially spaced holes, pivot means in said recess, said sector plate having a flexible loop at its apical end engaged on said pivot means so that the sector plate is rotatable on said pivot means and is radially slidable between two positions, whereby said sector plate may be rotated to any one of several positions to select one of the first passages and one of the second passages, and whereby the sector plate may be pulled outwardly to align certain holes in the sector plate with the selected one of the first and second passages, so that a mixture of liquids from one compartment and any one of the other compartments is discharged through one of the outlet pipes, said cylindrical wall carrying a plurality of concentric cylindrical flanges for receiving other cylindrical flanges of another vessel in interfitting, sealed relationship to form a stack of vessels, said bottom support having at least one depending further cylindrical flange elevating the same above a supporting surface to define a heating compartment for receiving a heater to heat the liquid contents of the compartments, whereby the heated contents of said compartments in turn heat said other vessel.

References Cited by the Examiner

UNITED STATES PATENTS

| | | | |
|---|---|---|---|
| 774,103 | 11/1904 | Pepin | 222—144.5 X |
| 922,281 | 5/1909 | Hine | 220—44 |
| 1,065,633 | 6/1913 | Stone | 220—4 |
| 1,203,117 | 10/1916 | Jacouatos | 222—144.5 X |
| 3,108,710 | 10/1963 | Lange | 220—72 X |

LOUIS G. MANCENE, *Primary Examiner.*

G. E. LOWRANCE, *Assistant Examiner.*